March 20, 1962   F. D. JONES   3,025,654
METHOD OF HARVESTING CORN
Original Filed April 23, 1956   2 Sheets-Sheet 1

INVENTOR.
FRANK D. JONES

*William A. Murray*
ATTORNEY

INVENTOR.
FRANK D. JONES

ATTORNEY

United States Patent Office 3,025,654
Patented Mar. 20, 1962

3,025,654
METHOD OF HARVESTING CORN
Frank D. Jones, Moline, Ill., assignor, by mesne assignments, to Deere & Company, a corporation of Delaware
Original application Apr. 23, 1956, Ser. No. 579,823, now Patent No. 2,934,879, dated May 3, 1960. Divided and this application Dec. 14, 1959, Ser. No. 859,244
8 Claims. (Cl. 56—63)

This invention relates to a method of harvesting corn and more particularly to a method of removing the ears of corn from the standing stalks.

This is a division of application, Ser. No. 579,823, filed April 23, 1956 which has issued as U.S. Patent 2,934,879.

One of the primary objections to the present day or more modern corn pickers is that considerable shelling of the corn occurs in the operation of removing the ears from the stalks. In the more conventional type corn pickers, snapping or removing of the ears occurs by guiding the stalks between a pair of fore- and-aft extending snapping rolls which operate to engage the stalks and drive them through the snapping rolls to cause the ears of corn on the stalks to be severed upon coming in contact with the snapping rolls, it being physically impossible for the ears of corn to pass between the snapping rolls. While in theory the ears of corn are supposed to guide over the snapping rolls, in practice the tip or butt end will tend to wedge between the rolls and consequently considerable of the ear may be shelled before the ear seats itself properly on the rolls. Also, when harvesting a field of extremely dry or mature corn, the mere contact or dropping of the ears on the snapping rolls will cause kernels to be dislodged from the ear. This is particularly so inasmuch as in many of the conventional type corn pickers the snapping rolls will also act to remove some of the husks from the ears, thus making the ears more susceptible to incidental shelling upon their coming in contact with the snapping rolls.

It is, therefore, the purpose of this invention to provide a new and novel method of corn harvesting which does not make use of the presently conventional type of snapping rolls for removing the ears from the stalks, nor does the removal of the ears from the stalks include a means which would operate to remove the husks from the ears before they reach the husking unit. Husking at the latter unit is desirable inasmuch as suitable collecting units may be provided for saving incidental kernels of corn which may be loosened from the ear in the husking operation.

It is the primary object of this invention to provide a new and novel method of removing ears of corn from the stalks by cutting the stalks into three portions, a median ear bearing portion, an upper waste portion, a lower portion which remains attached to the ground, and collecting the ear bearing portions and moving them to the corn husking unit.

It is also an object of this invention to provide with the above method of severing a method of positioning each stalk of corn as it moves through the harvesting unit into a position whereby the ear bearing portion is substantially uniformly placed relative to the cutting elements.

It is still a further object of the invention to include with the above method of removing ears a method of conveying which includes both conveying and discarding the upper waste portions of the stalks outwardly of the harvesting unit and collecting the median ear-bearing portions and moving them to a suitable ear treating or husking unit.

These and other objects of the invention will become apparent to those skilled in the art upon a full understanding of the invention as herein disclosed and as shown in the accompanying drawings.

Figure 1:
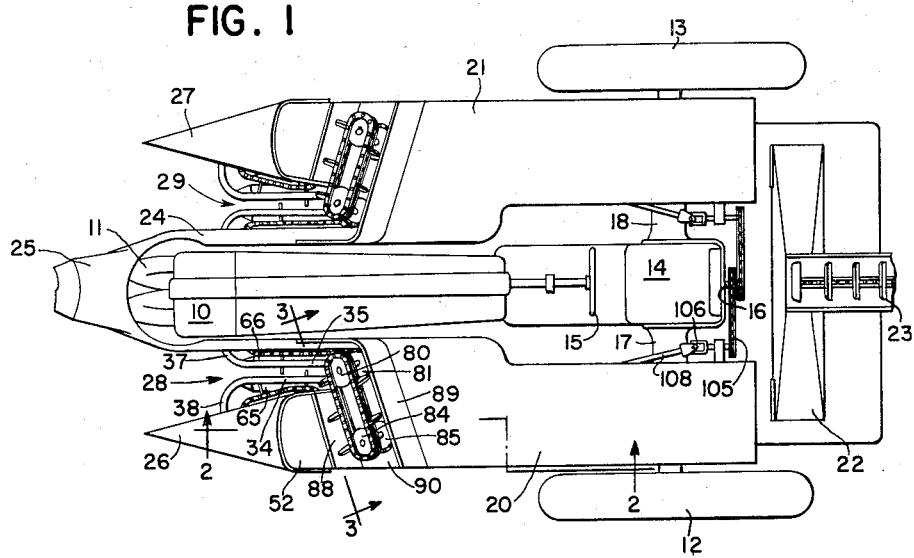
FIGURE 1 is a plan view of a tractor and a portion of the harvesting unit which incorporates the principles of this invention.

For convenience of description, the invention is disclosed in the form of a two-row tractor-mounted corn picker. It should be recognized that the basic structure using the principles of the invention would operate in any type of corn harvester, it being unimportant as to the type of motive power provided for its movement over the field of corn or for the operation of the parts of the harvester. The tractor is a conventional tricycle type tractor having a longitudinally extending body 10 supported at its forward end by front wheels 11 and at its rearward end by left and right transversely spaced rear wheels 12, 13. An operator's station includes a tractor seat 14 provided at the rear of a suitable steering wheel 15. A standard type power take-off shaft 16 is centrally positioned on the tractor and extends rearwardly from beneath the seat 14.

The tractor also has left- and right-hand axle housings 17, 18 containing the rear axles which operate to space the rear wheels 12, 13 from the tractor body 10. Directly above and mounted on the axle housing 17 is a crop-treating or husking unit 20 of the left-hand harvesting unit. Mounted directly over and mounted on the axle housing 18 is a crop-treating or husking unit 21 of the right-hand harvesting unit. The left- and right-hand harvesting units 20, 21 receive crops from the forward crop severing unit and deliver the crops in a treated or husked condition rearwardly to a transverse hopper 22 which places the corn in the lower end of a centrally positioned and rearwardly extending discharge elevator 23. The husking units 20, 21, the hopper 22, and the elevator 23 may be considered, for the purposes of this invention, to be of a conventional type and details are therefore omitted. However, specific details of similar husking, hopper, and elevator units are shown in U.S. Patent 2,622,382.

The harvesting unit comprises supporting structure including external shielding 24 positioned alongside opposite sides of the tractor body 10 and which converges at its forward end forward of the tractor front wheels 11 to a central divider point 25. Positioned outwardly from the central dividing point 25 are left- and right-hand gathering points 26, 27, respectively, which are spaced laterally from the central shielding 24 to form gathering structure for moving the stalks into left and right stalk passages 28, 29, respectively. The shielding 24, divider point 25, and gathering points 26, 27 are supported by suitable framework, not shown in detail but indicated as a part of a main framework 30, which is mounted on the tractor to permit raising or lowering of the gathering units.

The left- and right-hand harvesting units are similar to one another with the exception of those obvious differences which are apparent due to the relative positioning of the units to the tractor. Consequently, details of only the left-hand unit will be given.

It should also be understood that the crop treating units at the rear of the harvesters are shown as husking units only for purpose of illustration, and that other types of crop-treating or crop-collecting units could be substituted or added without departing from the basic invention.

Forming the stalk passage 28 are a pair of rigid elongated members or bars 34, 35 etxending fore-and-aft and laterally spaced apart to permit the row of stalks to pass between. The rear end of the members 34, 35 are bolted as at 36 to the main frame 30. The forward ends of the bars or members 34, 35 are flared outwardly, as at 37, and inwardly, as at 38, respectively, to form at the forward end a passage throat conducive to guiding stalks into the passage 28. The forward ends of the members 34, 35 are also rigidly supported on the main frame 30.

On either side of the passage 28 are a pair of vertically spaced apart gathering chains. To the left of a passage 28 are upper and lower gathering chains 39, 40, respectively. The upper chain 39 is mounted over sprockets 41, 42, 43 which in turn are carried by sprocket shafts 44, 45, 46, respectively. Also mounted on the shafts 44, 45, 46 are lower sprockets 47, 48, 49, on which the lower gathering chain 40 is mounted. The inner runs of the gathering chains 39, 40 extend through upper and lower slots 50, 51 respectively, in outer shielding 52 which is a rearward extension of the outer dividing housing point 26.

Figure 2:
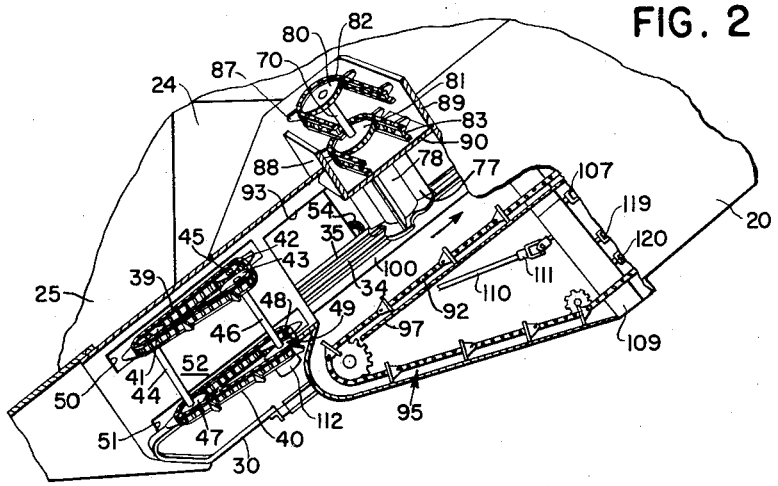
FIGURE 2 is an enlarged sectional view taken along the lines 2—2 of FIG. 1.

On the inner side of the passage 28 are upper and lower gathering chains 53, 54, respectively. The chains 53, 54 are mounted at their rear over a pair of rear sprockets 55, 56 which are fixed on a shaft 57 which in turn has its lower end supported in a gear housing 58 (see FIG. 3). The forward end of the ends of the gathering chains 53, 54 are mounted over idler sprockets which are carried on a shaft supported on the main frame 30. The latter sprockets and shafts are not shown, but any suitable mounting arrangement would suffice for purposes of this invention. Viewing FIGS. 2 and 4, it becomes apparent that the sprocket shafts 44, 45, 46 and 57 are inclined forwardly and laterally outwardly relative to the horizontal thereby causing the gathering chains 39, 40, 53, 54 to be in planes at an angle to the horizontal. The lugs of the gathering chains 39, 40, 53 and 54 extend inwardly, relatively to the passage 28, of the elongated bars 34, 35 and obviously serve to drive the stalks rearwardly between the elongated bars.

Mounted beneath the bars 34, 35 on opposite sides of the passage 28 and on the main frame 30 is a pair of rotatable rolls 65, 66. The rolls 65, 66 are rotatably driven so that the inner adjacent portions of the rolls will move downwardly. The surface of the rolls 65, 66 are smooth and the rolls are spaced apart laterally to a degree in which stalks passing between the rolls will be drawn downwardly, but with a small amount of resistance against downward movement by the stalks, the rolls 65, 66 will rotatably slide against the stalks. This latter feature becomes important inasmuch, as will later be explained, the sliding action will prevent the ear of corn on the stalks from being prematurely severed or detached from the stalks.

Figure 4:
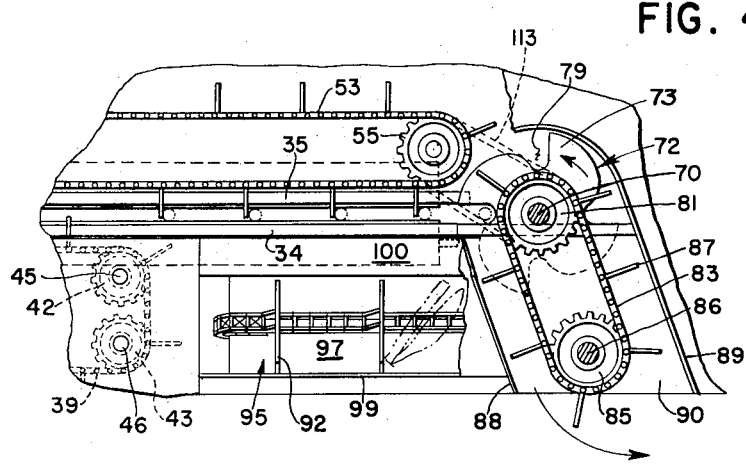
FIGURE 4 is a sectional view taken along the lines 4—4 of FIG. 3.

Directly to the rear of the pasage 28 is a driveshaft 70 which is parallel to the aforesaid sprocket shafts 44–46, and 57 and which is supported on the main frame 30 by means of a bearing housing fixed to the rigid bars or members 34, 35. Mounted on the lower portion of the shaft 70 is a cutting unit, indicated in its entirety by the reference numerals 72, composed of upper and lower cutting elements 73, 74, respectively, each of the cutting elements being divided into four segments, the leading edge of each segment being formed into a knife edge extending radially from the axis of the shaft 70, and the trailing edge extending from the outer end of the knife edge radially and angularly inwardly to where it continues into the knife edge of the next segment. As shown in FIG. 4, each of the segments form a pocket, as at 79, with the following segment for receiving the stalks moving through the passage 28. The guide bars 34, 35 pass beneath and adjacent to the lower cutting elements 74 of the cutting unit 72 and the adjacent portion of the bar 34 operates as a stationary knife cooperating with the cutting edges of the lower cutting element 74 to sever the stalks at that point. Fixed to the main frame 30 and etxending above and adjacent to the upper cutting elements 73 is a stationary knife 75 which is bolted, as at 76, to the frame 30 and which extends forwardly and operates in conjunction with the cutting edges of the upper cutting element 73 to sever the stalks passing in the pockets 79 of the upper element.

Extending between the upper and lower cutting elements of the cutting unit 72 are four radially extending and vertically disposed plates 77, rigidly fixed to the elements 73, 74. The inner edges of the plate 77 are fixed to a vertical cylindrical shaped support 78.

Mounted on the upper end of the shaft 70 are upper and lower sprockets 80, 81, respectively, on which is mounted upper and lower chains 82, 83. The chains 82, 83 run transversely to the direction of travel and are mounted at their outer extremity on upper and lower sprockets 84, 85, respectively, which are journaled on an idler sprocket shaft 86. Lugs 87 extend outwardly from the chains 82, 83. Front and rear upright housing members 88, 89 are fixed to the shielding of the harvesting units and serve in conjunction with the lugs on the conveyor chains 82 and 83 as conveyor means for moving materials outwardly of the harvesting unit. Also fixed to the shielding of the harvesting unit is a lower housing plate 90 which rides adacent to and beneath the lower conveyor chain 83. Thus, the chains 82, 83 are surrounded in three directions, being left open only from above.

Positioned outwardly of the stalk passage 28 and the cutting element 72 is a fore-and-aft extending elevator 95, commonly referred to as the first or husking elevator, and which for purposes of this invention is conventional and will not be shown or described in detail in the present disclosure, but which is so disclosed in the aforesaid U.S. Patent 2,622,382. The elevator comprises basically a flight type conveyor 91 having an upper run 92 adapted to receive ears of corn and deliver them to the husking bed. Surrounding the upper run 92 at its forward end is a trough-like housing 96 composed of a lateral portion 97 positioned under the upper run 92 and two upright portions 98, 99 on the inner and outer side of the run 92, respectively. The upright portions 98 are flanged inwardly as at 100 to lie adjacent or proximate to the lower cutting element of the cutting unit 72. An opening 93 is provided in the side parts of the harvester housing to permit passage of the ears from the severing portion to the discharge or husking elevator 95.

Driving mechanism for operating the corn harvesting unit is provided from the power take-off shaft 16 through the medium of a chain drive 105 which extends transversely from the center of the tractor. A pair of universal joints 106, 107 interconnected by a connecting rod or shaft 108 conveys the power from the chain drive 105 forwardly to a gear transmission encased in a transmission housing 109 (see FIGS. 1, 2). Extending forwardly from the transmission housing 109 is a drive shaft 110 which is suitably connected by universal joint means at its front and rear ends, as at 111, ultimately to be connected to a bevel type gear arrangement enclosed in a gear housing 112 at the lower end of the sprocket shaft 45 which operates to drive the outer pair of gathering chains 39, 40. A similar drive arrangement, not shown, is provided to drive the inner pair of gathering chains 53, 54 through the gear housing 58.

Figure 5:
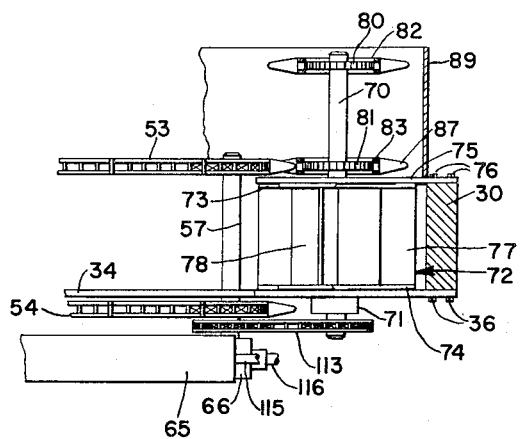
FIGURE 5 is a sectional view taken along the lines 5—5 of FIG. 3.

A chain drive 113 (FIGS. 4 and 5) interconnects the shafts 57 and 70. Rotation of the shaft 57 therefore causes rotation of the shaft 70 which in turn drives the cutting unit 72 and the upper conveying mechanism or conveyor chains 84, 85. The rolls 65, 66 have rearwardly extending drive shafts 115, 116, respectively, which are interconnected by spur gears, also not shown, but which are more or less a conventional method of driving rolls of this type. The shaft 115 extends rearwardly and enters the gear housing 109 (FIG. 2) where it is rotatably driven by suitable gearing within the housing. Other drive mechanism of the harvester is driven from the gear housing 109 by means of rearwardly extending shafts 119, 120 shown partially only in FIG. 2.

Figure 3:
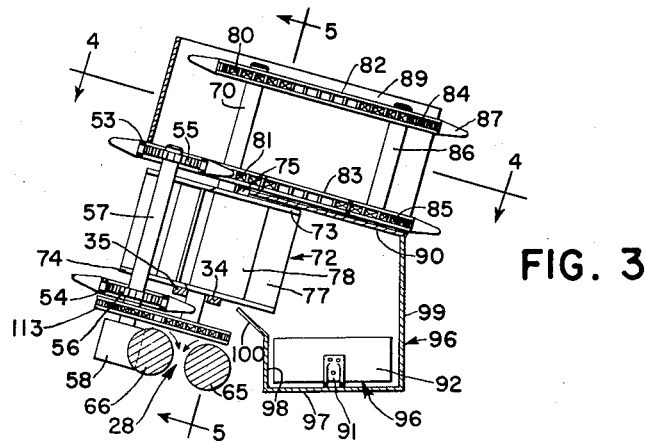
FIGURE 3 is an enlarged sectional view taken substantially along the lines 3—3 of FIG. 1. For clarity, portions of the housing have been removed.

The corn harvester operates in the following manner. The standing corn enters the machine as the unit is driven over the rows of corn. The gathering chains 53, 54 and 39, 40 assist in positioning the stalks as the stalks enter between the rigid elongated members 34, 35 and maintain the stalks in a substantially upright position, or to be more exact, in a position substantially parallel to the gathering chain drive shafts 44, 46 and 57. The positioning rolls 65, 66 rotating in the direction indicated by the arrows as shown in FIG. 3 operate to drive the stalks downwardly. As previously mentioned the positioning rolls 65, 66 apply only enough friction on the stalks to pull them down in a position in which the butt end of the ears come into contact with the guides or rigid members 34, 35. When the stalks and ears reach this latter postiion, the rolls will rotate without pulling the stalk down any further and thus the ears will not snap or be severed from the stalk in this particular operation. The gathering chains, in conjunction with the forward movement of the implement along the ground, will drive the stalks rearwardly to the rear end of the stalk passage 28 where they will be delivered by the inner gathering chains 53, 54 to the pockets 79 of the cutting unit 72. When the stalks reach this selected zone in their rearward movement the rolls 65, 66 will by this time have positioned the ears of corn where they will abut the rigid members or bars 34, 35. The cutting elements 73, 74 of the cutting unit 72 will sever the stalks above and below the ears thereby dividing the stalks into three portions, an upper waste portion, a central or median ear bearing portion, and a lower portion which remains attached to the ground.

The height of the plates 77 is substantially equal to the length of an unhusked ear of corn and thus the central or median portion of the stalk is substantially the length of the adjacent ear of corn which is connected thereto. As the stalk is severed into its three portions, the plates 77 of the cutting element 72 will act as paddles to drive or convey the central or ear bearing portion outwardly (see FIG. 4). Since the axis of the cutting unit 72 is tipped toward the conveyor, gravity will also aid in moving or causing the ears to fall in the direction of the husking elevator 95 which will collect the central or ear bearing portions of the stalks and deliver them to the corn treating or husking unit of the harvesting machine. Thus, the paddles or plates 77 operate as a conveyor means for moving the ears of corn into the intake portion of the husking elevator.

The upper conveying means comprising the chain conveyors 82, 83 engage the upper portion of the stalks as they are severed and drive them outwardly of the unit to be discharged at one side of the corn harvesting machine. The upper conveyor housing 88—90 prevents intermingling of the waste portion of the stalk with the central ear bearing portions and causes the waste portions to be positively removed from the unit thereby aiding in the prevention of clogging the unit by the upper portions of the stalks.

While only one form of the invention has been shown, it should be recognized that other forms and variations, particularly pertaining to the details of the invention, could exist without departing basically from the broad general principles herein disclosed. It should therefore be understood that while the preferred embodiment of the invention has been described with the view of clearly and concisely illustrating the principles of the invention, it is desired not to so limit or narrow the invention beyond that which is claimed.

What is claimed is:

1. A method of harvesting corn from ground-borne corn stalks by a mobile harvester, comprising: moving over the field to successively receive stalks of corn; positioning the stalks to effect uniform vertical positioning of the ears of corn relative to the ground; severing the stalks adjacent the point of attachment to the ears and substantially an ear-length above the point of attachment, thereby dividing the stalks into median portions including the ears, upper waste portions, and lower waste portions, said lower waste portions remaining ground-borne; conveying the upper waste portions outwardly of the harvester; and collecting the ears and median portions.

2. A method of harvesting corn comprising: moving over a field of corn to successively receive talks of a row; aggressively gripping the stalks to maintain substantial vertical disposition of the stalks as they are successively received; positioning the vertically disposed stalks relative to the ground whereby the ear-bearing portion on each successive stalk is positioned at substantially the same level relative to the ground; severing the stalks in vertically spaced locations whereby the stalks will be separated into upper waste portions, lower ground-borne portions, and median portions including the ears; separating the upper waste portions from the ears and median portions; conveying the upper waste portions to a discharge area for gravitational return to the ground; conveying the ears and median portion of the stalk from the area of severance; and treating the ear-bearing portions of the stalks to separate the median portions of the stalks and other waste from the corn.

3. A method of harvesting corn comprising: moving over a field of corn to successively receive stalks of a row; aggressively gripping the stalks to maintain substantial vertical dispostion of the stalks as they are successively received; positioning the vertically disposed stalks relative to the ground whereby the ear-bearing portion on each successive stalk is positioned at substantially the same level relative to the ground; severing the stalks in vertically spaced locations whereby the stalks will be separated into upper waste portions, lower ground-borne portions, and median portions including the ears; conveying the upper waste portions to a discharge area for gravitational return to the ground; and treating the ears and median portions of the stalks to separate the median portions of the stalks and other waste from the corn.

4. A method of harvesting corn comprising: moving forwardly over a field of corn to successively receive stalks of a row; gripping the stalks from opposite sides to maintain substantial vertical disposition of the stalks as they are successively received; positioning the stalks vertically relative to the ground whereby the ear-bearing portion on each successive stalk is positioned at substantially the same level relative to the ground; severing the stalks in vertically spaced locations whereby the stalks will be separated into upper waste portions, lower ground-borne portions, and median portions including the ears; conveying the upper waste portions to a discharge area for return to the ground; and collecting the ears an median portions of the stalks.

5. A method of harvesting corn comprising: moving forwardly over a field of corn to successively receive stalks of a row; positioning the stalks vertically relative to the ground whereby the ear-bearing portion on each successive stalk is positioned at substantially the same level relative to the ground; severing the stalks in vertically spaced locations whereby the stalks will be separated into upper waste portions, lower ground-borne portions, and median portions including the ears; conveying the upper waste portions to a discharge area for return to the ground; and collecting the ears and median portions of the stalks.

6. A method of harvesting corn comprising: moving over a field of corn to successively receive stalks of a row;

aggressively gripping the stalks from opposite sides and beneath the ear-bearing portions of the stalks moving the stalks downwardly; limiting downward movement of the stalks whereby the ear-bearing portion on each successive stalk is positioned at substantially the same level relative to the ground; severing the stalks in vertically spaced locations whereby the stalks will be separated into upper waste portions, lower ground-borne portions, and median portions including the ears; conveying the upper waste portion to a discharge area for gravitational return to the ground; and treating the ears and median portions of the stalks to separate the median portion of the stalk and other waste from the corn.

7. A method of harvesting corn comprising: moving over a field of corn to successively receive stalks of a row; positioning the stalks whereby the median portion including the ear on each successive stalk is positioned in a selected zone; severing the stalks into upper waste portions, lower waste portions, and median portions including the ears; and collecting the ears and median portions of the stalks.

8. A method of harvesting corn comprising: moving over a field of corn to successively receive stalks of a row; positioning the stalks whereby the ear-bearing portion on each successive stalk is positioned in a selected zone; severing the stalks adjacent the area joining the ear to the stalks and substantially an ear length away from the area joining the ear to the stalk whereby the stalks will be separated into upper waste portions, lower waste portions, and median portions including the ears; and collecting the ears and median portions of the stalks.

References Cited in the file of this patent

UNITED STATES PATENTS

| | | |
|---|---|---|
| 2,436,831 | Silva | Mar. 2, 1948 |
| 2,529,515 | Silva | Nov. 14, 1950 |